(12) United States Patent
Umezawa

(10) Patent No.: US 7,048,099 B2
(45) Date of Patent: May 23, 2006

(54) BOTTOM VALVE APPARATUS OF HYDRAULIC SHOCK ABSORBER

(75) Inventor: Susumu Umezawa, Saitama (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 10/636,119

(22) Filed: Aug. 7, 2003

(65) Prior Publication Data

US 2004/0129516 A1 Jul. 8, 2004

(30) Foreign Application Priority Data

Jan. 8, 2003 (JP) ............... 2003-002642

(51) Int. Cl.
*F16F 9/34* (2006.01)
(52) U.S. Cl. .............. 188/322.14; 188/322.13
(58) Field of Classification Search .......... 188/322.14, 188/322.13, 322.15, 315, 322.16, 282.5; 137/493.8, 493.9, 493, 543.15; 251/175
See application file for complete search history.

(56) References Cited

U.S. PATENT DOCUMENTS

| | | | | |
|---|---|---|---|---|
| 3,321,051 A | * | 5/1967 | Heckethorn | ............. 188/315 |
| 4,815,576 A | | 3/1989 | Tanaka | |
| 6,672,436 B1 | * | 1/2004 | Keil et al. | .......... 188/322.14 |

FOREIGN PATENT DOCUMENTS

| | | | |
|---|---|---|---|
| EP | 1113186 | | 7/2001 |
| EP | 1148268 | | 10/2001 |
| GB | 2226620 | | 7/1990 |
| GB | 2397110 | * | 7/2004 |
| JP | 227900 | | 8/2002 |

* cited by examiner

*Primary Examiner*—Pam Rodriguez
(74) *Attorney, Agent, or Firm*—Orum & Roth LLC

(57) ABSTRACT

In a bottom valve apparatus of a hydraulic shock absorber in which a flow passage is formed in a bottom piece, and a check valve opening and closing the flow passage and a spring urging the check valve are fixed to one face side of the bottom piece by a fixing member, such as a nut, the check valve and the spring are subassembled in the fixing member, such as the nut.

10 Claims, 5 Drawing Sheets

BOTTOM VALVE APPARATUS OF HYDRAULIC SHOCK ABSORBER

BACKGROUND OF THE INVENTION

1. Field of the Invention

The present invention relates to a bottom valve apparatus of a hydraulic shock absorber.

2. Description of the Related Art

A bottom valve apparatus of a hydraulic shock absorber may be structured, as described in Japanese Unexamined Patent Publication No. 2002-227900 (patent publication 1), such that a push side flow passage and a pull side flow passage are formed in a bottom piece. A push side damping valve opening and closing the push side flow passage and a pull side check valve opening and closing the pull side flow passage are respectively provided in a lower face side and an upper face side of the bottom piece. The push side damping valve, the pull side check valve, and a coil spring urging the check valve are fixed by a bolt and a nut which are inserted to the bottom piece.

However, when the bottom valve apparatus is assembled, the bolt to which the damping valve is fitted is extended through the bottom piece from a lower surface side of the bottom piece, the check valve and the coil spring are fitted to a protruding end of the bolt, and the bolt is fastened by the nut. When the nut is fastened, there is, generated assembly failure on rare occasions, such that a centering of the check valve is misaligned with respect to the bottom piece, and the coil spring rotates together with the nut and gets under the check valve so as to be caught in a position between the bottom piece and the check valve.

SUMMARY OF THE INVENTION

An object of the present invention is to improve an assembling property of a bottom valve apparatus.

The present invention relates to a bottom valve apparatus of a hydraulic shock absorber comprising: a bottom piece, a flow passage formed in the bottom piece, a check valve opening and closing the flow passage, and a spring urging the check valve.

The check valve and the spring are fixed to one face side of the bottom piece by a fixing member.

The check valve and the spring are subassembled in the fixing member.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

First Embodiment. FIGS. 1 to 6

Figure 1:
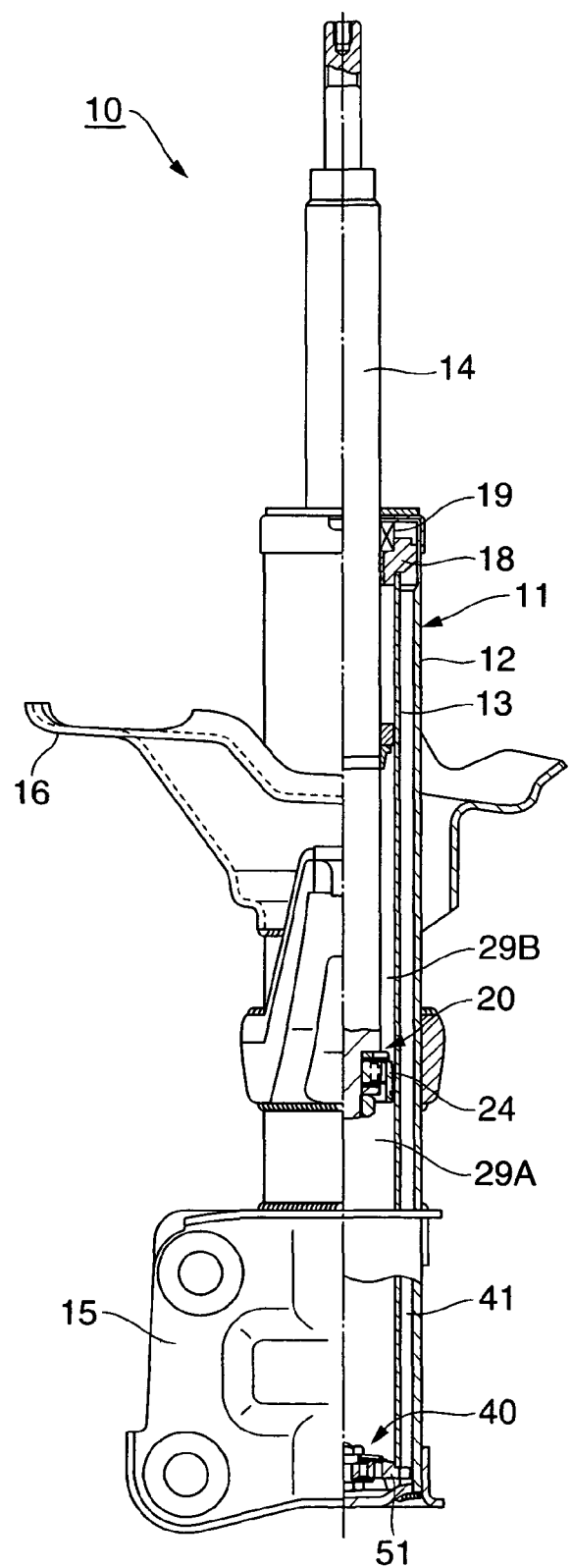
FIG. 1 is a half cross sectional view showing a hydraulic shock absorber.

FIG. 1 shows a twin tube type hydraulic shock absorber 10 constituting a strut type suspension. In the hydraulic shock absorber 10, a damper tube 11 is formed as a double tube comprising an outer tube 12 and an inner tube 13. The hydraulic shock absorber 10 constructs a suspension apparatus of a vehicle is formed by inserting the piston rod 14 to the inner tube 13 built in the outer tube 12, connecting a vehicle body side mounting bracket (not shown) to an upper end portion of the piston rod 14 and connecting a lower end portion of the outer tube 12 to a wheel side by a knuckle bracket 15.

The hydraulic shock absorber 10 is structured such that a suspension spring (not shown) is interposed between a lower spring seat 16 disposed in an outer periphery of the outer tube 12 and an upper spring seat (not shown) supported by a mounting bracket in an upper end portion of the piston rod 14, thereby absorbing impact forces generated when the vehicle travels.

The hydraulic shock absorber 10 is structured such that when the inner tube 13 is disposed in the outer tube 12 in an uprising manner, the lower end portion of the inner tube 13 is centered and supported to the bottom portion of the outer tube 12 via a bottom piece 51, and the upper end portion of the inner tube 13 is centered and supported to an upper end opening portion of the outer tube 12 via a rod guide 18. Further, the hydraulic shock absorber 10 is provided with a shaft seal portion 19 such as an oil seal or the like through which the piston rod 14 is extended, in an upper portion of the rod guide 18. The shaft seal portion 19, the rod guide 18, the inner tube 13 and the bottom piece 51 are clamped between the caulking portion of the upper end in the outer tube 12 and the bottom portion of the outer tube 12.

The hydraulic shock absorber 10 has a piston valve apparatus which may be an extension side damping force generating apparatus 20 and a bottom valve apparatus 40 which may be a compression side damping force generating apparatus. The hydraulic shock absorber 10 controls a stretching vibration of the damper tube 11 and the piston rod 14 caused by absorption of the impact force by the suspension spring.

Figure 2:
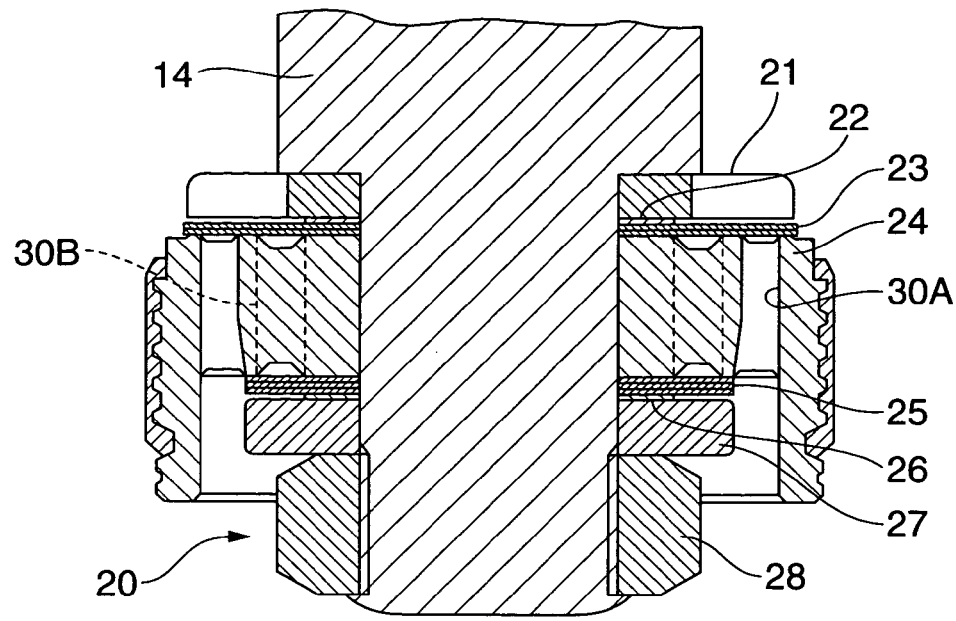
FIG. 2 is an enlarged cross sectional view showing a piston valve apparatus.

Piston Valve Apparatus 20:

The piston valve apparatus 20 is structured, as shown in FIG. 2, such that a valve stopper 21, a valve spacer 22, a check valve 23, a piston 24, a disc valve 25, a valve spacer 26 and a valve stopper 27 are attached to the piston rod 14, and are fixed by a nut 28. The piston 24 divides an inner portion of the inner tube 13 into a piston side damper chamber 29A and a rod side damper chamber 29B. The piston 24 forms a push side flow passage 30A and a pull side flow passage 30B communicating both the damper chambers 29A and 29B, is provided with the check valve 23 in the push side flow passage 30A, and is provided with the disc valve 25 in the pull side flow passage 30B.

When the hydraulic shock absorber 10 is compressed, oil in the piston side damper chamber 29A passes through the push side flow passage 30A so as to flexibly deform and open the check valve 23, and the oil is introduced to the rod side damper chamber 29B. When the hydraulic shock absorber 10 is extended, oil in the rod side damper chamber 29B passes through the pull side flow passage 30B so as to flexibly deform and open the disc valve 25, flowing to the piston side damper chamber 29A, thereby generating an extension side damping force.

Figure 3:
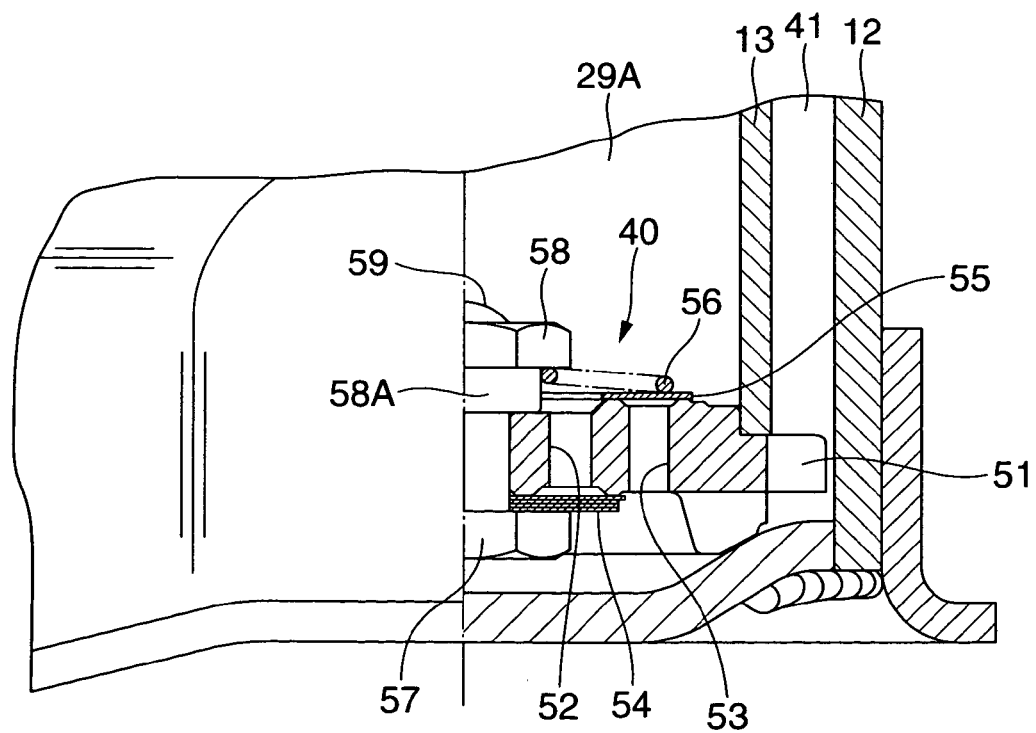
FIG. 3 is an enlarged cross sectional view showing a bottom valve apparatus.

Bottom Valve Apparatus 40:

The hydraulic shock absorber 10 is structured such that a reservoir chamber 41 is formed between the outer tube 12 and the inner tube 13, and an inner portion of the reservoir chamber 41 is sectioned by an oil chamber and a gas chamber. The bottom valve apparatus 40 divides the piston side damper chamber 29A and the reservoir chamber 41 by the bottom piece 51 provided between the bottom portion of the outer tube 12 and the lower end portion of the inner tube 13, as shown in FIG. 3.

Figure 4:
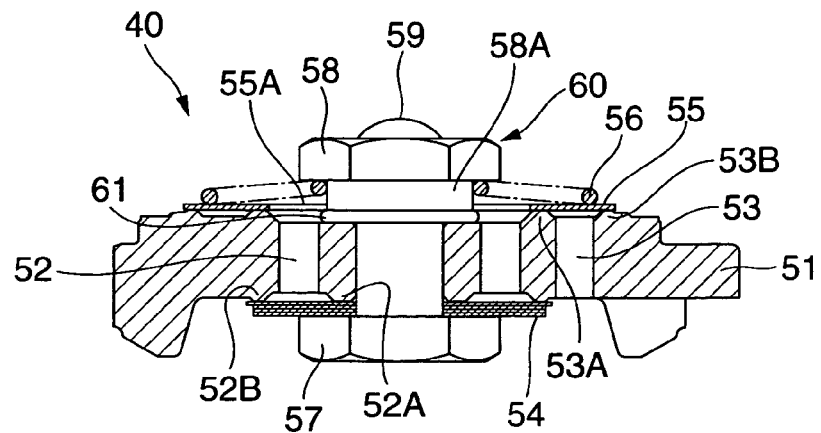
FIG. 4 is a cross sectional view showing a bottom valve apparatus in accordance with a first embodiment in a state in which the bottom valve apparatus is taken out.
Figure 5:
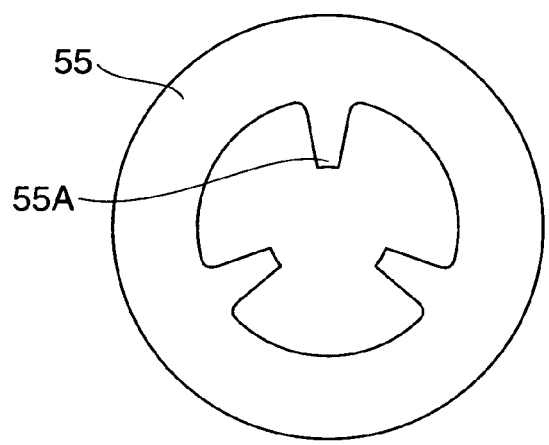
FIG. 5 is a plan view showing a check valve.

In the bottom valve apparatus 40, as shown in FIG. 4, a push side flow passage 52 and a pull side flow passage 53 which communicate the piston side damper chamber 29A with the reservoir chamber 41 are formed in the bottom piece 51 corresponding to a molded body formed by filling a sintered powder in a metal mold. The bottom valve apparatus 40 is provided with a disc-like damping valve 54 opening and closing the push side flow passage 52 in a lower face side of the bottom piece 51, and is provided with a disc-like check valve 55 opening and closing the pull side flow passage 53 and a coil spring 56 urging the check valve 55 in an upper face side of the bottom piece 51. Annular seats 52A and 52B for seating and releasing the damping valve 54 are raised in the vicinity of an inner side and an outer side of the push side flow passage 52 on the lower face of the bottom piece 51, and annular seats 53A and 53B for seating and releasing the check valve 55 are raised in the vicinity of an inner side and an outer side of the pull side flow passage 53 on the upper face of the bottom piece 51.

The bottom valve apparatus 40 is structured such that a bolt 57 passing through the damping valve 54 is inserted from the lower face side of the bottom piece 51, and the check valve 55 and the coil spring 56 are arranged in the vicinity of the protruding end of the bolt 57 protruding to the upper face side of the bottom piece 51. A nut 58 is engaged with the protruding end of the bolt 57, and the check valve 55 and the coil spring 56 are centered and fastened by the nut 58. The nut 58 is provided with a centering guide 58A for the check valve 55 and the coil spring 56 in an outer periphery in a side brought into contact with the upper face of the bottom piece 51 (FIG. 4). Centering projections 55A (FIG. 5) provided in a plurality of positions in a peripheral direction of the inner periphery of the check valve 55, and an inner periphery of the coil spring 56, are brought into contact with the centering guide 58A in an outer periphery of the nut 58, whereby the check valve 55 and the coil spring 56 are centered with respect to a center axis of the bottom piece 51. An end portion of the bolt 57 protruding to an upper face of the nut 58 is formed as a caulked portion 59 so as to prevent the nut 58 from rotating.

When the hydraulic shock absorber 10 is compressed, oil in the piston side damper chamber 29A passes through the push side flow passage 52 so as to flexibly deform and open the damping valve 54. The oil flows to the reservoir chamber 41, and generates a compression side damping force. When the hydraulic shock absorber 10 is extended, the oil in the reservoir chamber 41 passes through the pull side flow passage 53 so as to flexibly deform and open the check valve 55, and is introduced to the piston side damper chamber 29A.

In this case, in the bottom valve apparatus 40, the following structure is provided for improving ease of assembly.

Figure 6:
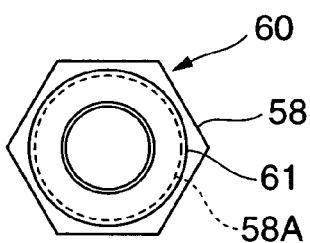
FIG. 6 is a plan view showing a nut.

In the bottom valve apparatus 40, a valve subassembly 60 obtained by subassembling the check valve 55 and the coil spring 56 in the nut 58 may be previously prepared. The valve subassembly 60 is provided, as shown in FIG. 6, with a projection 61 in a lower end portion brought into contact with the upper face of the bottom piece 51 adjacent to the centering guide 58A in the outer periphery of the nut 58. The valve subassembly 60 is manufactured by fitting the coil spring 56 to the centering guide 58A from a side of the projection 61 and thereafter by pressing the centering projection 55A of the check valve 55 from a side of the projection 61 so as to fit into the centering guide 58A. At this time, the centering projection 55A of the check valve 55 overcomes the projection 61 of the nut 58 due to elastic deformation as a result of the pressing, and is supported by the projection 61 of the nut 58. The coil spring 56 may be designed and built to climb the projection 61 of the nut 58 due to elastic deformation of the inner periphery. The projection 61 is formed as a flange-like full periphery projection all over an entire periphery of the outer periphery of the nut 58. In this case, the projection 61 may be constituted by partial projections which are provided in a plurality of positions along the outer periphery of the nut 58.

When the valve subassembly 60 is assembled in the bottom piece 51, the projection 61 of the nut 58 is provided at a level lower than a level of annular seats 53A and 53B for the check valve 55 provided in the bottom piece 51, and therefore does not prevent the check valve 55 from seating on annular seats 53A and 53B.

The valve subassembly 60 may be designed and built such that the check valve 55 and the coil spring 56 do not come off from the nut 58 when screwing the nut 58 with the bolt 57 inserted to the bottom piece 51, where a compact subassembly structure is sufficient. The structure may be made such that the centering guide for the check valve 55, the coil spring 56, and the projection in accordance with the present invention may be provided around an outer periphery of an underhead side of the bolt 57, and the valve subassembly 60 may be structured to support the coil spring 56 and the centering projection 55A of the check valve 55 by the projection.

In accordance with the present embodiment, the following operations and effects can be obtained.

(1) The valve subassembly 60 is prepared such that the check valve 55 and the coil spring 56 are subassembled in the nut 58, or the bolt 57. Therefore, the bolt 57 to which the damping valve 54 is fitted is passed through from the lower face side of the bottom piece 51, and the nut 58 of the valve subassembly 60 is fastened to the protruding end of the bolt 57. In accordance with the valve subassembly 60, it is possible to prevent assembly failure such as where the centering of the check valve 55 is misaligned with respect to the bottom piece 51, the coil spring 56 gets under the check valve 55 so as to be caught in a portion between the bottom piece 51 and the check valve 55. Further, the number of assembling man-hours required is reduced.

(2) The valve subassembly 60 is manufactured such that the centering projection 55A in the inner periphery of the check valve 55 overcomes the projection 61 provided in the entire periphery of the nut 58 as a result of the elastic deformation, whereby the valve subassembly 60 can be easily arranged in such a manner as to be secure from unintended disassembly.

Figure 7:
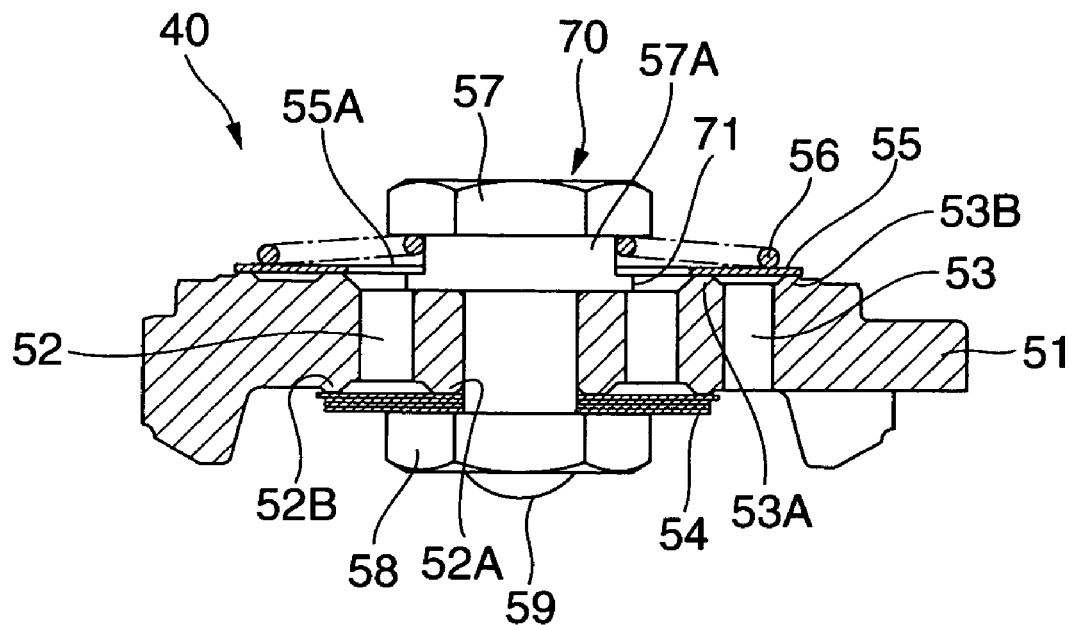
FIG. 7 is a cross sectional view showing a bottom valve apparatus in accordance with a second embodiment in a state in which the bottom valve apparatus is taken out.
Figure 8:
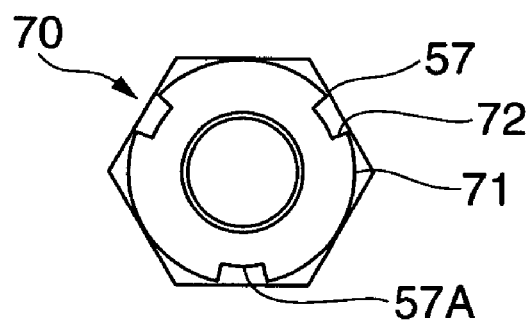
FIG. 8 is a plan view showing a bolt.

Second Embodiment. FIGS. 7 and 8

A bottom valve apparatus 40 in accordance with a second embodiment is different from the bottom valve apparatus 40 in accordance with the first embodiment in that a valve subassembly 70 in which the check valve 55 and the coil spring 56 are subassembled in the bolt 57 is used.

The valve subassembly 70 is provided with a centering guide 57A for the check valve 55 and the coil spring 56 below the head of the bolt 57 and along an outer periphery in a side brought into contact with the upper face of the bottom piece 51, as shown in FIGS. 7 and 8. The centering projection 55A of the check valve 55 and the inner periphery of the coil spring 56 are brought into contact with the centering guide 57A of the bolt 57, whereby the check valve 55 and the coil spring 56 are centered with respect to the center axis of the bottom piece 51. The end portion of the bolt 57 protruding to the lower face of the nut 58 is formed as a caulked portion 59 so as to prevent the nut 58 from rotating.

In this case, the valve subassembly 70 is provided with partial projections 71 in a plurality of positions in a peripheral direction of the portion brought into contact with the upper face of the bottom piece 51 below the head of the bolt 57 and adjacent to the centering guide 57A. The centering projection 55A in the inner periphery of the check valve 55 overcomes the partial projection 71 of the bolt 57 on the basis of an elastic deformation, whereby the centering projection 55A of the check valve 55 is supported by the partial projections 71 of the bolt 57. The centering projection 55A is aligned with the partial projection 71 in a peripheral direction of the bolt 57 by fitting the coil spring 56 to the centering guide 57A from a side of the partial projection 71. The centering projection 55A of the check valve 55 is pressed to a side of the centering guide 57A from a location between the adjacent partial projections 71 of the bolt 57 such that the centering projection 55A of the check valve 55 is aligned with a groove 72 formed between the adjacent partial projections 71 in the peripheral direction of the bolt 55, slightly rotating the check valve 55. Accordingly, the centering projection 55A of the check valve 55 is engaged with the partial projection 71 of the bolt 57 on the basis of an elastic force of the coil spring 56 so as to arrange the valve subassembly 70.

The structure may be arranged such that the centering guide for the check valve 55 and the coil spring 56 and the partial projection in accordance with the present invention are provided in an outer periphery of the nut 58. The valve subassembly 70 may be structured to support the coil spring 56 and the centering projection 55A of the check valve 55 by the partial projection.

In accordance with the present embodiment, the following operations and effects can be obtained.

(1) The valve subassembly 70 may be prepared such that the check valve 55 and the coil spring 56 are subassembled in the bolt 57, or the nut 58. The bolt 57 of the valve subassembly 70 is passed through from the upper face side of the bottom piece 51, and the damping valve 54 is fitted to the protruding end of the bolt 57, and is fastened by the nut 58. In accordance with this valve subassembly 70, it is possible to prevent the assembly failures such that the centering of the check valve 55 is misaligned with respect to the bottom piece 51, the coil spring 56 gets under the check valve 55 so as to be caught in a position between the bottom piece 51 and the check valve 55, and the like. Further, the number of assembling man-hours required is reduced.

(2) The centering projection 55A of the check valve 55 and the partial projection 71 of the bolt 57 are engaged by passing the centering projection 55A along the inner periphery of the check valve 55 through a groove 72 between the partial projections 71 in the outer periphery of the bolt 57 in an axial direction, and thereafter relatively rotating slightly in the peripheral direction, whereby the valve subassembly 70 can be easily manufactured.

Figure 9:
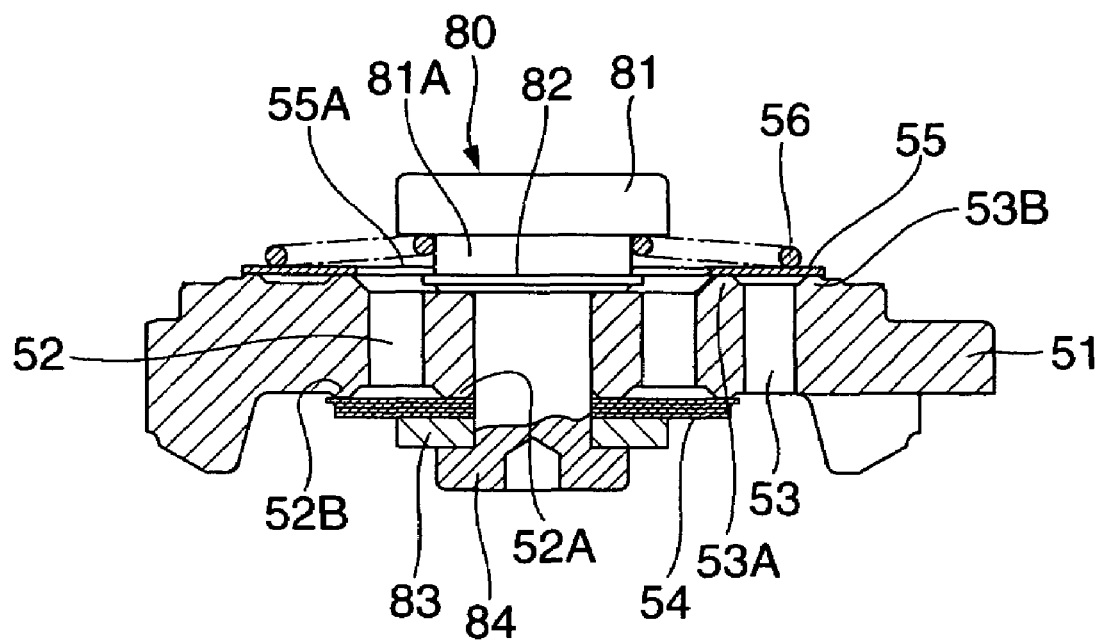
FIG. 9 is a cross sectional view showing a bottom valve apparatus in accordance with a third embodiment in a state in which the bottom valve apparatus is taken out.
Figure 10:
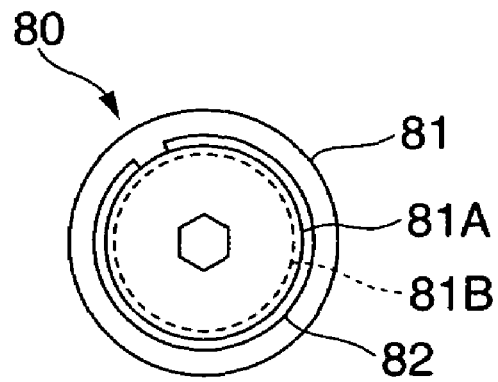
FIG. 10 is a plan view showing a rivet.

Third Embodiment. FIGS. 9 and 10

A bottom valve apparatus 40 in accordance with a third embodiment is different from the bottom valve apparatus 40 in accordance with the first embodiment in that a valve subassembly 80 in which the check valve 55 and the coil spring 56 are subassembled in a rivet 81 which is employed in place of the bolt 57 and the nut 58 is used.

The valve subassembly 80 is provided with a centering guide 81A for the check valve 55 and the coil spring 56 below the head of the rivet 81 and along an outer periphery in a side brought into contact with the upper face of the bottom piece 51, as shown in FIGS. 9 and 10. The centering projection 55A of the check valve 55 and the inner periphery of the coil spring 56 are brought into contact with the centering guide 81A of the rivet 81, whereby the check valve 55 and the coil spring 56 are centered with respect to the center axis of the bottom piece 51. The damping valve 54 and a washer 83 are assembled in the rivet 81 protruding to the lower face of the bottom piece 51, and are fixed by a caulked portion 84.

In one embodiment, the valve subassembly 80 is provided with an annular groove 81B along an outer periphery of the portion brought into contact with the upper face of the bottom piece 51 below the head of the rivet 81 and adjacent to the centering guide 81A. The centering projection 55A of the check valve 55 is supported by a stop ring 82 of the rivet 81 by fitting the check valve 55 and the coil spring 56 to the centering guide 81A and thereafter locking the stop ring 82 with the annular groove 81B.

The structure may be arranged such that the entire peripheral projection such as the projection 61 in the first embodiment is provided along the outer periphery below the head of the rivet 81, or the partial projection such as the projection 71 in the second embodiment may be provided. The coil spring 56 and the centering projection 55A of the check valve 55 may be supported by the entire projection or the partial projection.

In accordance with the present embodiment, the following operations and effects can be obtained.

(1) The valve subassembly 80 may be prepared such that the check valve 55 and the coil spring 56 are subassembled in the rivet 81. The rivet 81 of the valve subassembly 80 is passed through from the upper face side of the bottom piece 51, and the damping valve 54 is fitted to the protruding end of the rivet 81, and is caulked. In accordance with adoption of the valve subassembly 80, it is possible to prevent assembly failure such that the centering of the check valve 55 is misaligned with respect to the bottom piece 51, and the coil spring 56 gets under the check valve 55 so as to be caught in a position between the bottom piece 51 and the check valve 55. Further, the number of assembling man-hours required is reduced.

(2) It is possible to easily and securely manufacture the valve subassembly 80 by fitting the coil spring 56 and the check valve 55 to the outer periphery of the rivet 81 and locking them by the snap ring 82.

As heretofore explained, embodiments of the present invention have been described in detail with reference to the drawings. However, the specific configurations of the present invention are not limited to the illustrated embodiments but those having a modification of the design within the range of the present claimed invention are also included in the present invention. For example, the present invention may be structured the subassembly is formed by fitting the spring such as the coil spring or the like and the check valve to the nut, the bolt or the rivet corresponding to the fixing member, thereafter forming the projection along the outer periphery of the fixing member in accordance with a caulking procedure, and supporting the check valve to the projection.

In accordance with the present invention, it is possible to improve the assembly properties of the bottom valve apparatus.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A bottom valve apparatus of a hydraulic shock absorber comprising:
   a bottom piece;
   a flow passage formed in the bottom piece;
   a check valve opening and closing the flow passage, said check valve having an aperture and a plurality of centering projections in an inner periphery of the check valve;
   a spring urging the check valve;
   the check valve and the spring being fixed to one face side of the bottom piece by a fixing member, said fixing member provided with a projection,
   wherein the check valve and the spring are subassembled in the fixing member and an inner circumference defined by the ends of the centering projections has a smaller diameter than an outer diameter of the projection of the fixing member.

2. The bottom valve apparatus of a hydraulic shock absorber according to claim 1, wherein the projection of the fixing member is provided in an outer periphery of the fixing member, and the centering projections are arranged and constructed to overcome the projection of the fixing member by elastic deformation, wherein the centering projections of the check valve are supported by the projection of the fixing member.

3. The bottom valve apparatus of a hydraulic shock absorber according to claim 2, wherein the fixing member is constituted by a bolt and a nut screwed with the bolt, the projection of the fixing member is provided in a lower end portion brought into contact with the bottom piece along an outer periphery of the nut, and the check valve and the spring are previously subassembled in the nut.

4. The bottom valve apparatus of a hydraulic shock absorber according to claim 3, wherein the spring comprises a coil spring.

5. The bottom valve apparatus of a hydraulic shock absorber according to claim 3, wherein the projection of the fixing member comprises a flange-like entire peripheral projection extending over an entire periphery of the outer periphery of the nut.

6. The bottom valve apparatus of a hydraulic shock absorber according to claim 2, wherein the spring comprises a coil spring.

7. The bottom valve apparatus of a hydraulic shock absorber according to claim 1, wherein the fixing member is constituted by a bolt and a nut screwed with the bolt, the projection is provided in a lower end portion brought into contact with the bottom piece along an outer periphery of the nut, and the check valve and the spring are previously subassembled in the nut.

8. The bottom valve apparatus of a hydraulic shock absorber according to claim 7, wherein the spring comprises a coil spring.

9. The bottom valve apparatus of a hydraulic shock absorber according to claim 7, wherein the projection of the fixing member comprises a flange-like entire peripheral projection extending over an entire periphery of the outer periphery of the nut.

10. The bottom valve apparatus of a hydraulic shock absorber according to claim 1, wherein the spring comprises a coil spring.

* * * * *